(12) United States Patent
O'Toole

(10) Patent No.: US 9,818,317 B2
(45) Date of Patent: Nov. 14, 2017

(54) SIGN HOLDER WITH REARWARD EXTENDING SUPPORT ARMS

(71) Applicant: Marchon Eyewear, Inc., Melville, NY (US)

(72) Inventor: Thomas O'Toole, Deer Park, NY (US)

(73) Assignee: Marchon Eyewear, Inc., Melville, NY (US)

( * ) Notice: Subject to any disclaimer, the term of this patent is extended or adjusted under 35 U.S.C. 154(b) by 0 days.

(21) Appl. No.: 15/235,913

(22) Filed: Aug. 12, 2016

(65) Prior Publication Data

US 2017/0046988 A1 Feb. 16, 2017

Related U.S. Application Data

(60) Provisional application No. 62/204,730, filed on Aug. 13, 2015.

(51) Int. Cl.
*G02C 5/00* (2006.01)
*G09F 7/18* (2006.01)
*G09F 23/00* (2006.01)

(52) U.S. Cl.
CPC ............. *G09F 7/18* (2013.01); *G02C 5/00* (2013.01); *G09F 23/00* (2013.01); *G09F 2007/1834* (2013.01); *G09F 2007/1843* (2013.01); *G09F 2007/1847* (2013.01); *G09F 2007/1856* (2013.01)

(58) Field of Classification Search
CPC . G02C 5/00; G02C 11/02; G02D 1/06; A41G 7/00
See application file for complete search history.

(56) References Cited

U.S. PATENT DOCUMENTS

| | | | | |
|---|---|---|---|---|
| 1,968,193 A | * | 7/1934 | Einson | G02C 7/10 2/12 |
| 2,792,744 A | * | 5/1957 | Hirsch | G01J 3/46 101/211 |
| 3,009,163 A | * | 11/1961 | Beauvais | A41G 7/00 2/206 |
| 3,709,587 A | * | 1/1973 | Wick | G02C 1/02 351/106 |
| 4,217,037 A | * | 8/1980 | Lemelson | G02C 9/00 351/44 |
| 4,400,067 A | * | 8/1983 | Joffe | G02C 1/06 351/59 |
| 4,508,526 A | * | 4/1985 | Dutcher | G02C 5/2272 156/108 |
| 4,560,258 A | * | 12/1985 | Stanley | G02C 5/006 351/115 |

(Continued)

*Primary Examiner* — Cassandra H Davis
(74) *Attorney, Agent, or Firm* — Brient Globerman, LLC; Kyle M. Globerman

(57) ABSTRACT

A sign holder for use with a display has a plaque having a first surface and a second surface. A mounting bracket is coupled to the second surface. A first and a second support arm are pivotally coupled to the mounting bracket. A catch is coupled to the mounting bracket and is positioned intermediate the first and the second support arms. In some embodiments, the first and second support arms are pivotable between a first position in which the first and second support arms are substantially perpendicular to the second surface, and a second position in which the first and second support arms are substantially parallel to the second surface.

17 Claims, 4 Drawing Sheets

(56) References Cited

U.S. PATENT DOCUMENTS

| | | | | |
|---|---|---|---|---|
| 4,879,770 | A * | 11/1989 | Vacilotto | G02C 1/06 2/441 |
| 4,958,823 | A * | 9/1990 | Iwaki | G03G 15/65 271/110 |
| 5,583,583 | A * | 12/1996 | Wilson | G02C 5/00 351/122 |
| 5,768,716 | A * | 6/1998 | Porsche | A61F 9/025 2/446 |
| 5,775,018 | A * | 7/1998 | Steinborn | G02C 11/02 40/299.01 |
| 7,156,106 | B2 * | 1/2007 | Lawson | G02C 11/02 132/275 |
| 2009/0000167 | A1 * | 1/2009 | Leonhardt | G09F 21/02 40/586 |

\* cited by examiner

SIGN HOLDER WITH REARWARD EXTENDING SUPPORT ARMS

CROSS REFERENCE TO RELATED APPLICATIONS

This application claims the benefit of U.S. Provisional Patent Application No. 62/204,730, filed Aug. 13, 2015, entitled "SIGN HOLDER WITH REARWARD EXTENDING SUPPORT ARMS," the entire disclosure of which is incorporated by reference herein in its entirety.

BACKGROUND

Eyewear merchants, manufacturers, and others may desire to display their eyewear in a manner that draws in customers and enables the customers to access and try on the eyewear easily. Typically, eyewear in stores is displayed on a rack or shelf. However, eyewear displayed in such locations make it difficult to also display signage related to the eyewear being displayed. Accordingly, there is a need for improved systems and methods for displaying information related to eyewear that address these considerations.

SUMMARY OF THE INVENTION

In various embodiments, a sign holder comprises (1) a plaque having a first surface and a second surface; (2) a mounting bracket coupled to the second surface; (3) a first support arm pivotally coupled to the mounting bracket; (4) a second support arm pivotally coupled to the mounting bracket and spaced apart from the first support arm; and (5) a catch coupled to the mounting bracket, wherein the catch is positioned intermediate the first and the second support arms. In some embodiments, the first and second support arms are pivotable between a first position in which the first and second support arms are substantially perpendicular to the second surface, and a second position in which the first and second support arms are substantially parallel to the second surface.

In other embodiments, a sign holder for use with a display comprises (1) a plaque having a first surface and a second surface; (2) a first support arm coupled to the second surface; (3) a second support arm coupled to the second surface; and (4) a catch coupled to and extending rearwardly from the second surface. In various the first and second support arms are moveable between a first position in which the first and second support arms extend substantially perpendicular to the second surface, and a second position in which the first and second support arms are positioned substantially parallel to the second surface.

In still other embodiments, a sign holder for use with a display comprises (1) a holder body having a first surface and a second surface; (2) a first support arm coupled to the second surface; (3) a second support arm coupled to the second surface; and (4) a catch extending rearwardly from the second surface. In particular embodiments, the first and second support arms extend substantially perpendicularly from the second surface.

BRIEF DESCRIPTION OF THE DRAWINGS

Various embodiments of the invention will be described below. In the course of the description, reference will be made to the accompanying drawings, which are not necessarily drawn to scale, and wherein.

DETAILED DESCRIPTION OF VARIOUS EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made to the present invention without departing from the scope or spirit thereof. For instance, features illustrated or described as part of one embodiment may be used in another embodiment to yield a still further embodiment. Thus, the present invention covers such modifications and variations as come within the scope of the appended claims and their equivalents. Like numbers refer to like elements throughout.

Sign Holder

Figure 1:
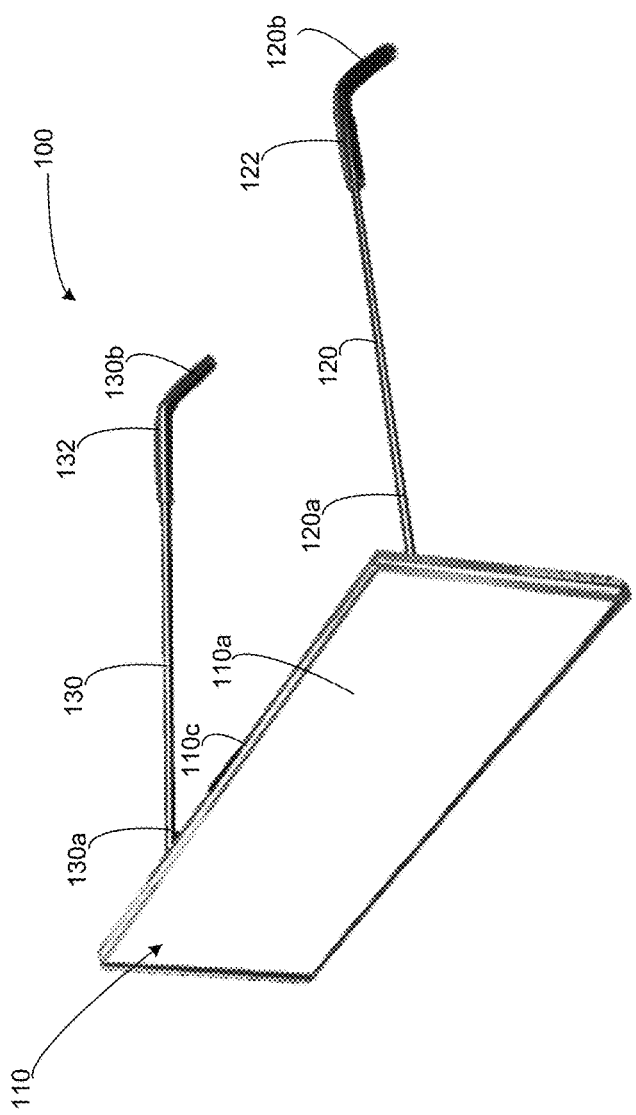
FIG. 1 is a front perspective view of a sign holder with rearward extending support arms according to a particular embodiment of the invention.
Figure 2:
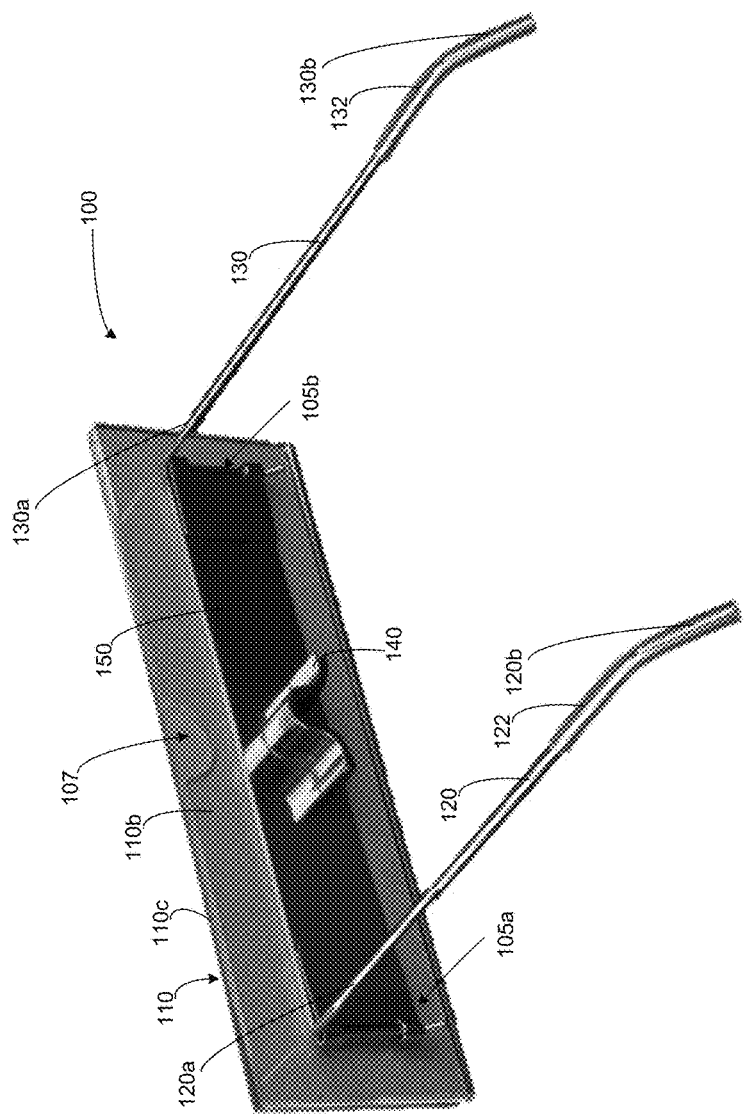
FIG. 2 is a rear perspective view of the sign holder shown in FIG. 1.
Figure 3:
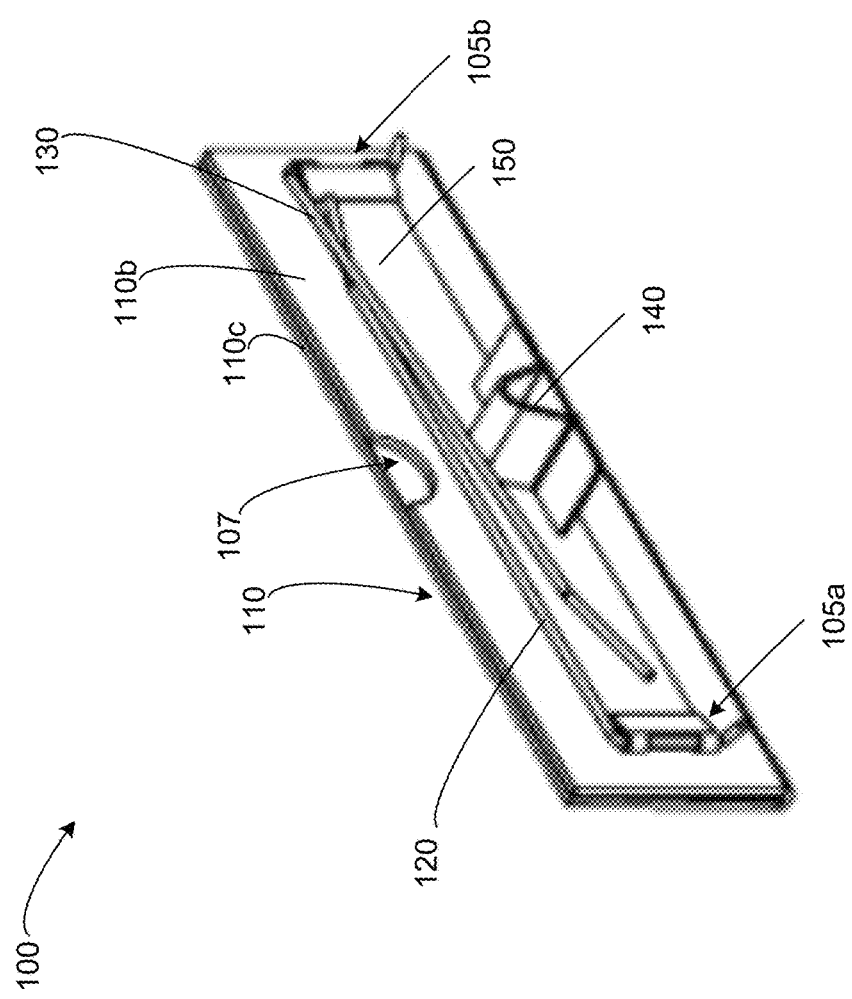
FIG. 3 is a rear perspective view of the sign holder shown in FIG. 1 in which the rearwardly extending support arms are shown in a folded orientation.

As shown in FIG. 1, a sign holder 100, according to various embodiments, includes: (1) a plaque (e.g., a sign holding body) 110; (2) a first support arm 120; and (3) a second support arm 130. As shown in FIGS. 2 and 3, the sign holder 100, according to various embodiments, also includes a catch 140. These various components are discussed in more detail below.

Plaque

As shown in FIGS. 1-3, the sign holder 100 includes a plaque 110. The plaque may be formed from any suitable material (e.g., metal, polymer, glass, etc.). In various embodiments, the plaque 110 is formed from a contiguous piece of plastic. In particular embodiments, the plaque 110 is formed from injection molded plastic.

The plaque 110 has a first surface 110*a* and a second surface 110*b* (FIGS. 2 and 3). The first and second surfaces 110*a*, 110*b* may be formed from the same material or may be formed from different materials. In particular embodiments, one of the front surface 110*a* and the second surface 110*b* is formed from a clear polymer. In various embodiments, one of the front surface 110*a* and the second surface 110*b* is formed from a metal.

The first and second surfaces 110*a*, 110*b* may be any suitable shape (e.g., circular, polygonal, etc.) with any suitable dimension (e.g., length, width, height, etc.). In various embodiments, the first and second surfaces 110*a*, 110*b* may be formed in the same shape or may be formed in different shapes. In various embodiments, one of the first surface 110*a* and the second surface 110*b* defines an opening there through and a peripheral continuous edge (e.g., a frame). For example, the first surface 110*a* may have a frame around an opening for displaying 2D and/or 3D advertising material. Additionally, one of the first and second surfaces defines a cutout 107 adjacent one of the edges of the first surface or the second surface.

In some embodiments, the first surface 110*a* may be integrally formed on at least one edge with the second surface 110*b*. In other embodiments, the first surface 110*a* may be coupled to the second surface 110*b* on at least one edge via any suitable coupling mechanism. In particular embodiments, the first surface 110a is spaced apart from the second surface 110b to define a cavity 110c intermediate the first surface 110a and the second surface 110b. In various embodiments, the cavity 110c may receive any suitable sign (e.g., any piece of advertising or other document), or even small objects or other materials.

Support Arms

As shown in FIGS. 1-3, the first and second support arms 120, 130 are coupled to the plaque second surface 110b by any suitable connection 105a, 105b such as brackets, a pivotal coupling, hinges, etc. The first support arm 120 has a first end 120a and a second end 120b. Similarly, the second support arm 130 has a first end 130a and a second end 130b. In various embodiments, the first support arm first end 120a has a first length having a first diameter and a second length having a second diameter that is larger than the first diameter. In particular embodiments, the second support arm first end 130a has a third length having a third diameter and a fourth length having a fourth diameter that is larger than the third diameter. The second length and the fourth lengths may be configured to prevent the first and second support arms 120, 130 from slipping out from a receiving hole in an eyeglass display stand. In other embodiments, the first support arm 120 and the second support arm 130 may have just one length (i.e., without any differentiating sections in diameter).

In some embodiments, instead of having a second length having a larger diameter than the first length and a fourth length having a larger diameter than the third length, the first support arm 120 includes a first sleeve 122 proximate the first support arm second end 120b and the second support arm 130 includes a second sleeve 132 proximate the second support arm second end 130b. The first and second sleeves 122, 132 may be formed from a polymer or elastomer and configured to prevent the first and second support arms 120, 130 from slipping out from the receiving hole in an eyeglass display stand and from damaging the eyeglass display stand.

The first and second support arms 120, 130 may be formed from any suitable material (e.g., metal, polymer, glass, etc.). The first and second support arms 120, 130 may be any suitable elongated shape (e.g., cylindrical, pyramidal, rectangular, polygonal, etc.) with any suitable dimension (e.g., length, width, height, diameter, etc.). In particular embodiments, the first and second support arms 120, 130 are dimensioned to fit into a temple opening for an eyeglass display stand.

The first and second support arms 120, 130 may be removably coupled to the plaque 110. In some embodiments, the first and second support arms 120, 130 may be integrally formed with the plaque 110. In particular embodiments, the first and second support arms 120, 130 may be coupled to the plaque 110 via any suitable coupling mechanism 105a, 105b (e.g., Velcro, magnet, glue, tongue and groove connection, ball and socket connection, spring hinge, friction fit, screw, spring loaded ball and catch, spring loaded pin and catch, spring tab and catch, etc.). In some embodiments, the plaque 110 may have a mounting bracket 150 for receiving the first support arm first end 120a and for receiving the second support arm first end 130a. In various embodiments, the mounting bracket 150 may be integrally formed with the plaque 110. In other embodiments, the mounting bracket 150 may be coupled or removably coupled to the plaque 110.

In various embodiments, the first and second support arms 120, 130 may be pivotally mounted to the plaque 110 using, for example, the mounting bracket 150. For example, the first and second support arms 120, 130 may pivot between a first position (FIG. 2) perpendicular to the plaque second surface 110b and a second position (FIG. 3) parallel to the plaque second surface 110b. In some embodiments, the first and second support arms 120, 130 may be rigidly mounted to the plaque 110. For example, the first and second support arms 120, 130 may remain in the first position perpendicular to the plaque second surface 110b.

Catch

As shown in FIGS. 2-3, the catch 140 extends rearwardly from the plaque second surface 110b. In particular embodiments, the catch 140 is positioned intermediate the first support arm 120 and the second support arm 130. The catch 140 may be formed from any suitable material (e.g., metal, polymer, glass, etc.). The catch 140 may be any suitable shape (e.g., cylindrical, pyramidal, rectangular, polygonal, etc.) with any suitable dimension (e.g., length, width, height, etc.). In various embodiments, the catch 140 is U-shaped. In particular embodiments, the catch 140 may be configured to support the sign holder 100 on a display such as an eyeglass display by receiving a portion of the display (e.g., a bridge support used for supporting eye glass frames).

The catch 140 may be removably coupled to the plaque 110. In some embodiments, the catch 140 may be integrally formed with the plaque 110. In particular embodiments, the catch 140 may be coupled to the plaque 110 via any suitable coupling mechanism (e.g., Velcro, magnet, glue, tongue and groove connection, ball and socket connection, spring hinge, friction fit, screw, spring loaded ball and catch, spring loaded pin and catch, spring tab and catch, etc.).

Exemplary Use

Figure 4:
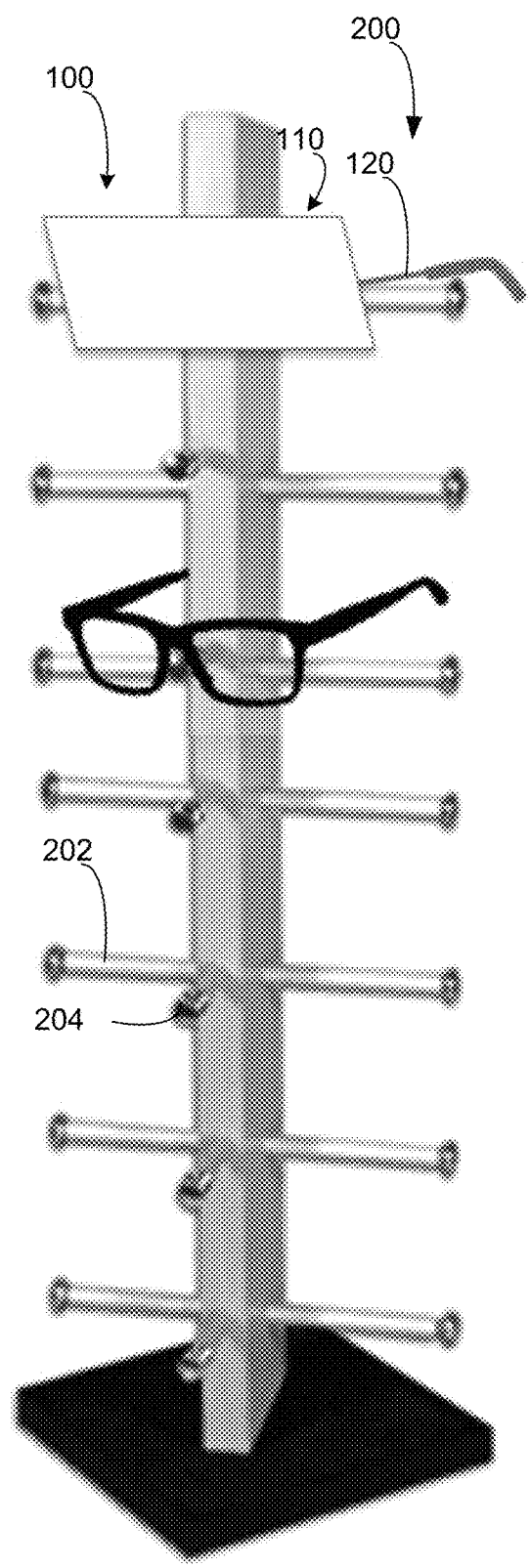
FIG. 4 is a front perspective view of the sign holder shown in FIG. 1 in which the sign is shown on a display stand.

As shown in FIG. 4, in various embodiments, the sign holder 100 may be placed on any suitable eyewear display stand 200 already known in the art. For example, the eyewear display stand 200 shown in FIG. 4 may comprise one or more pegs 202 for the temples of eyewear (e.g., a temple supporting surface) and a nosepiece holder 204 (e.g., a nose piece supporting surface) for the nosepiece of eyewear. A user may place any type of advertising material such as, for example, a brand name label into the cavity 110c formed between the plaque first surface 110a and second surface 110b. The user may then place the sign holder 100 on the eyewear display stand 200 by placing the catch 140 (not shown) on the nosepiece holder 204 and the rearwardly extending support arms 120, 130 on the pegs 202. A user may place the sign holder 100 at any desired location on the typical eyewear display stand 200. The sign holder 100 may be used to indicate that the brand, style, and/or price of the eyewear near the sign holder 100. The sign holder 100 may also be used to indicate a particular sale for the eyewear near the sign holder 100. In various embodiments, the sign holder 100 may also be used with an eyeglass display board that contains one or more through holes that are configured to receive the temples of eyewear and corresponding nosepiece supporting surfaces. For example, the rearwardly extending support arms 120, 130 may be inserted into the one or more through holes and the catch 140 may rest on the nosepiece supporting surface.

Referring to FIG. 3, in particular embodiments, an eyewear display stand may not include openings or pegs for receiving the first and second support arms 120, 130 of the sign holder 100. In this case, the user may fold the first and second support arms 120, 130 parallel to the plaque second surface 110b in order to place the sign holder 100 onto the eyewear display stand. The sign holder 100 will maintain its position on the eyewear display stand due to the catch 140 coupled to the plaque second surface 110b. Similarly, the folding of the first and second support arms 120, 130 allow the user to easily store the sign holder 100 when it is not in use.

Conclusion

Many modifications and other embodiments of the invention will come to mind to one skilled in the art to which this invention pertains having the benefit of the teachings presented in the foregoing descriptions and the associated drawings. For example, as will be understood by one skilled in the relevant field in light of this disclosure, the invention may take form in a variety of different mechanical and operational configurations. Therefore, it is to be understood that the invention is not to be limited to the specific embodiments disclosed herein, and that the modifications and other embodiments are intended to be included within the scope of the appended exemplary concepts. Although specific terms are employed herein, they are used in a generic and descriptive sense only and not for the purposes of limitation.

What is claimed is:

1. A sign holder comprising:
   a. a plaque having a front panel and a rear panel that is spaced apart from the front panel;
   b. a mounting bracket coupled to a rear surface of the rear panel;
   c. a first support arm pivotally coupled to the mounting bracket;
   d. a second support arm pivotally coupled to the mounting bracket and spaced apart from the first support arm; and
   e. a catch coupled to the rear panel, wherein the catch is positioned intermediate the first and the second support arms,
      wherein when a sign is inserted intermediate the front and rear panels, the sign can be read through the front panel.

2. The sign holder of claim 1, wherein the first and second support arms are pivotable between:
   a. a first position in which the first and second support arms are substantially perpendicular to the rear panel; and
   b. a second position in which the first and second support arms are substantially parallel to the rear panel.

3. The sign holder of claim 1, wherein:
   a. the first support arm is coupled to the mounting bracket by a first hinge; and
   b. the second support arm is coupled to the mounting bracket by a second hinge.

4. The sign holder of claim 1, wherein the front panel has an opening formed therein so that the front panel defines a frame that surrounds the opening.

5. The sign holder of claim 1, wherein the front panel is formed from a see-through material.

6. A sign holder for use with a display, the sign holder comprising:
   a. a plaque having a first surface and a second surface that can be moved apart from the first surface so that a sign can be inserted intermediate the first and second surfaces;
   b. a first support arm coupled to the second surface;
   c. a second support arm coupled to the second surface; and
   d. a catch coupled to and extending rearwardly from the second surface, wherein the catch is substantially U-shaped,
      wherein the first and second support arms are moveable between:
         a first position in which the first and second support arms extend substantially perpendicular to the second surface, and
         a second position in which the first and second support arms are positioned substantially parallel to the second surface.

7. The sign holder of claim 6, wherein the first and second support arms are pivotally mounted to the second surface.

8. The sign holder of claim 6, wherein the first support arm has a first length having a first diameter and a second length having a second diameter that is larger than the first diameter.

9. The sign holder of claim 6, wherein the first surface is spaced apart from the second surface and a cavity is defined between the first surface and the second surface that is configured to receive a sign.

10. The sign holder of claim 6, wherein one of the first surface and the second surface is formed from a clear polymer.

11. The sign holder of claim 6, wherein one of the first surface and the second surface is formed from a metal.

12. The sign holder of claim 6, wherein one of the first surface and the second surface defines an opening there through and a peripheral continuous edge.

13. A sign holder for use with a display, the sign holder comprising:
   a. a holder body having a first surface and a second surface that is spaced apart from the first surface so that a sign can be placed intermediate the first and second surfaces;
   b. a first support arm coupled to the second surface;
   c. a second support arm coupled to the second surface;
   d. a mounting bracket coupled to the second surface, wherein the first and the second support arms are coupled to the mounting bracket; and
   e. a catch extending rearwardly from the second surface, wherein the first and second support arms extend substantially perpendicularly from the second surface, and the catch is coupled to the mounting bracket.

14. The sign holder of claim 13, wherein the first arm and the second arm are each pivotally coupled to the second surface.

15. The sign holder of claim 13, wherein one of the first surface and the second surface is formed from a clear material.

16. The sign holder of claim 13, wherein the first surface and the second surface are configured to receive a sign intermediate the first surface and the second surface.

17. The sign holder of claim 16, wherein one of the first surface and the second surface further comprises a cutout positioned at an edge of the one of the first surface and the second surface.

* * * * *